United States Patent

Roshanravan

[11] Patent Number: 5,310,485
[45] Date of Patent: May 10, 1994

[54] PROCESS FOR DISSOLVED GAS FLOTATION IN ANAEROBIC WASTEWATER TREATMENT

[75] Inventor: Mel Roshanravan, Coppell, Tex.
[73] Assignee: Darling-Delaware Company, Inc., Dallas, Tex.
[21] Appl. No.: 953,853
[22] Filed: Sep. 30, 1992
[51] Int. Cl.$^5$ .................... C02F 3/28; C02F 1/24
[52] U.S. Cl. .................... 210/603; 210/608; 210/605; 210/703; 210/706
[58] Field of Search ............ 210/603, 608, 605, 614, 210/703, 622, 706

[56] References Cited

U.S. PATENT DOCUMENTS

| | | | |
|---|---|---|---|
| 2,360,811 | 10/1944 | Kelly | 210/608 |
| 2,360,812 | 10/1944 | Kelly | 210/608 |
| 2,430,519 | 11/1947 | Mallory . | |
| 2,777,815 | 1/1957 | Forrest | 210/603 |
| 2,786,025 | 5/1957 | Lamb et al. . | |
| 2,793,185 | 5/1975 | Albrektsson . | |
| 2,987,186 | 6/1961 | Burjoon | 210/608 |
| 3,175,687 | 3/1965 | Jones | 210/221.2 |
| 3,482,694 | 12/1969 | Rice . | |
| 3,574,331 | 4/1971 | Kurosawa et al. . | |
| 3,617,539 | 11/1971 | Grutsch | 210/608 |
| 3,981,800 | 9/1976 | Ort | 210/603 |
| 4,067,801 | 1/1978 | Ishida | 210/603 |
| 4,202,763 | 5/1980 | Shimizu et al. . | |
| 4,243,521 | 1/1981 | Thorp . | |
| 4,255,262 | 3/1981 | O'Cheakey et al. . | |
| 4,267,050 | 5/1981 | Conway | 210/608 |
| 4,297,216 | 10/1981 | Ishida | 210/603 |
| 4,338,192 | 7/1982 | Krasnoff et al. . | |
| 4,372,856 | 2/1983 | Morrison | 210/608 |
| 4,415,452 | 11/1983 | Heil et al. . | |
| 4,432,870 | 2/1984 | Russell . | |
| 4,460,470 | 7/1984 | Reimann | 210/608 |
| 4,501,664 | 2/1985 | Heil et al. . | |
| 4,511,370 | 4/1985 | Hunziker | 210/603 |
| 4,587,019 | 5/1986 | Wolinski . | |
| 4,624,791 | 11/1986 | Ferriss . | |
| 4,735,725 | 4/1988 | Reischel et al. . | |
| 4,767,537 | 8/1988 | Davis | 210/608 |
| 4,919,815 | 4/1990 | Copa | 210/603 |
| 4,956,080 | 9/1990 | Josefik | 210/221.2 |
| 5,015,384 | 5/1991 | Burke | 210/608 |

FOREIGN PATENT DOCUMENTS

| | | | |
|---|---|---|---|
| 111657 | 9/1978 | Japan | 210/608 |
| 113955 | 9/1979 | Japan | 210/608 |
| 15279 | 4/1980 | Japan | 210/603 |
| 5517633 | 5/1980 | Japan | 210/608 |
| 6988 | 2/1982 | Japan | 210/603 |
| 144099 | 9/1982 | Japan | 210/603 |

Primary Examiner—Thomas M. Lithgow
Attorney, Agent, or Firm—Harold E. Meier

[57] ABSTRACT

A process for gas entrainment of wastewater in an anaerobic wastewater treatment system includes the steps of withdrawing wastewater from an anaerobic digester and piping it into a flotation container. Thereafter the wastewater is pumped into a free standing tank having pressure in the tank maintained at a predetermined level through the injection into the tank of compressed gas generated by anaerobic digestion occurring in the treatment system. The wastewater is removed from the tank and pumped through a multiple jet configuration wherein gas from the tank is entrained in the wastewater as the water is injected back into the tank. The gas entrained water is then discharged from the tank back into the flotation container where the gas bubbles particles to the surface of the water to form a sludge layer. The sludge layer formed on the surface of the water in the flotation container is recycled to the digester for further increased digestion, thereby providing an efficient flotation process with increased wastewater clarification, reduced disturbance of the anaerobic bacterial sludge layer, and efficient utilization of the gas generated by anaerobic digestion in the system.

8 Claims, 6 Drawing Sheets

PROCESS FOR DISSOLVED GAS FLOTATION IN ANAEROBIC WASTEWATER TREATMENT

TECHNICAL FIELD

The present invention relates generally to anaerobic treatment of wastewater, and more particularly to a process for dissolved gas flotation wherein a gas other than air or oxygen is used to separate solids from anaerobically treated wastewater.

BACKGROUND OF THE INVENTION

The treatment of wastewater has historically been accomplished through anaerobic and aerobic processes. In the aerobic treatment of wastewater, a system exposes the wastewater to an oxygen atmosphere. A dissolved air flotation ("DAF") system is an example of a system using an aerobic process.

In a typical DAF system, recycled water or the raw wastewater is pressurized in a pressurization tank. Compressed air is then added to the water in the pressurization tank. This water, along with flocculating chemicals is introduced into the DAF vessel. Bubbles are formed as the air entrained in the water is released from pressure. The particles attach themselves to or become trapped by the bubbles. As the bubbles rise to the surface of the water, the particles are carried along. When the bubbles reach the surface the air escapes, forming a foam or sludge layer on the surface. The sludge layer contains the particles deposited by the escaping air bubbles. The sludge layer is kept intact and skimmed from the vessel to be processed by various means. Thus, through aeration, the wastewater is fed needed air and chemicals and the water clarified.

In an anaerobic process, digestion of the organic matter by gas forming bacteria occurs in a digester. Historically, anaerobic treatment of wastewater has not included aeration of the wastewater for further clarification where the use of oxygen or air to aerate the wastewater will cause the resultant sludge to become inactive since anaerobic treatment requires an oxygen-free atmosphere. In presently available anaerobic processes the wastewater is not well flocculated, making it difficult to separate solids from the liquor, resulting in less clarity than achieved in wastewater treated aerobically.

SUMMARY OF THE INVENTION

The present invention overcomes the above difficulties by circulating anaerobically treated wastewater through a DAF system as used in aerobic treatment of wastewater. Instead of bubbling air through the wastewater to clarify the water, gas generated in the digester and in the flotation container is recirculated through a gas entrainment system remote from the flotation container. Recirculation of the gas generated by the anaerobic digestive process for entrainment in the wastewater results in a more efficient treatment process with greater resultant clarity of the treated water.

Recycling the anaerobically treated wastewater from the flotation container and recycling the gas produced in the digester and the flotation container through the gas entrainment system and back into the flotation container results in improved gas entrainment for increased flotation of particles, more efficient utilization of system generated gas, reduced damage to the bacterial sludge for recycling into the digester, and further clarification of the wastewater, thereby resulting in an efficient process for achieving a higher level of effluent clarity in a system for anaerobic treatment of wastewater.

BRIEF DESCRIPTION OF THE DRAWINGS

A more complete understanding of the invention may be had by reference to the following Detailed Description when taken in conjunction with the Accompanying Drawings wherein.

DETAILED DESCRIPTION

Figures 1, 11, 12:
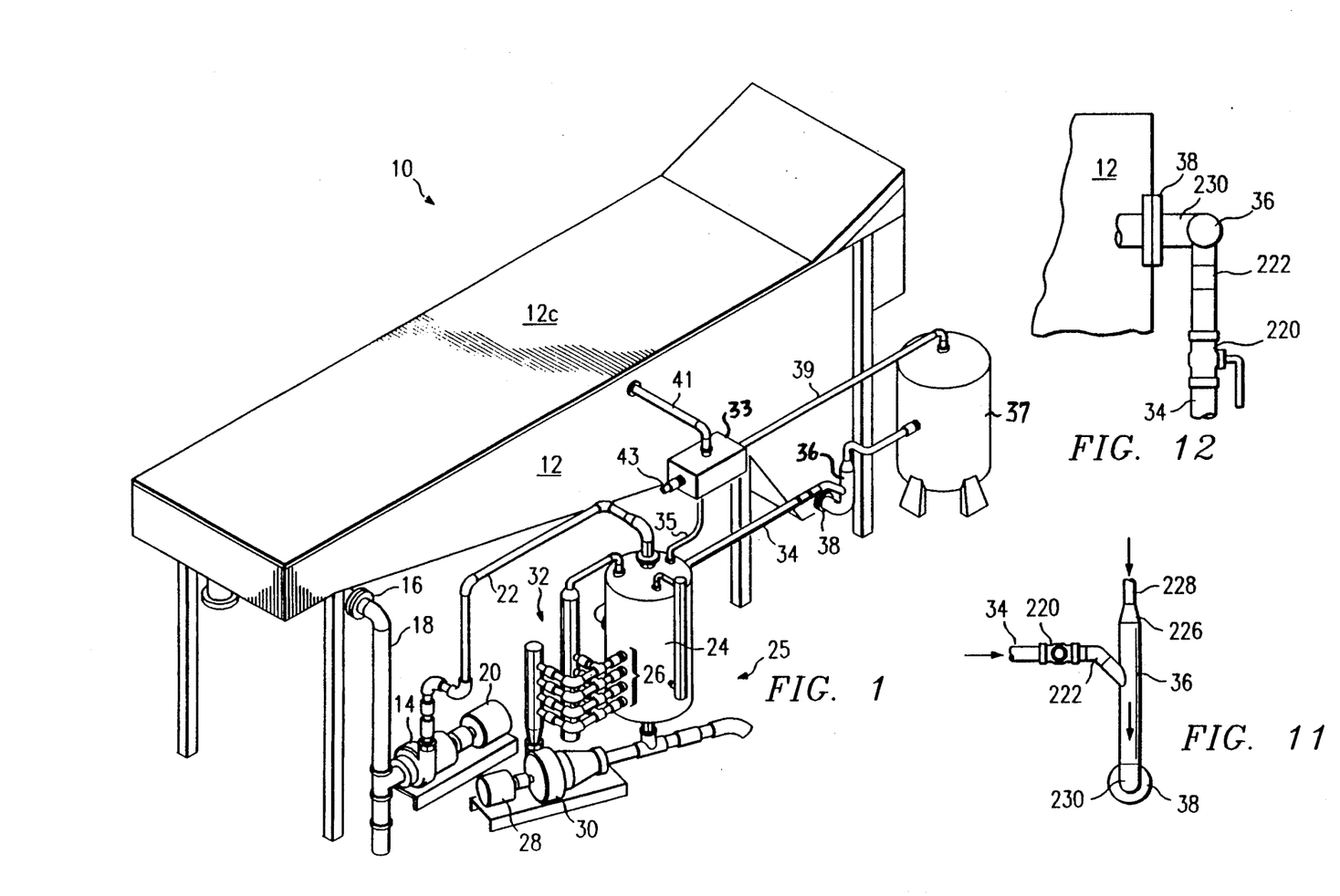
FIG. 1 is a perspective view of an anaerobic treatment system wherein the process of the present invention is carried out, having a digester, a flotation container and an aeration system.
FIG. 11 is a side view of the piping configuration for directing the flow of aerated water from the aeration system of FIG. 8 to the flotation container of FIG. 2.
FIG. 12 is a top view of the piping configuration of FIG. 11.

Referring now to the Drawings, and more particularly to FIG. 1, there is shown an anaerobic wastewater treatment system 10 wherein the steps of the anaerobic treatment process of the present invention are carried out. The anaerobic system 10 includes a flotation container 12 having a lid 12c. Wastewater in the container 12 is pumped by a recycle pump 14 from an outlet 16 in the uppermost end of the container 12 through a recycle pipe 18. A motor 20 supplies operating power to the pump 14 to direct the flow of wastewater through connecting pipe 22 to a gas entrainment tank 24 as part of a gas entrainment system 25.

A motor 28 provides operating power to a pump 30 to pump wastewater from the gas entrainment tank 24 into a plurality of jets 26. Compressed gas from the top of the gas entrainment tank 24 passes through a piping configuration 32 into the jets 26 where it is entrained in the wastewater as the water is forced through the jets by the pump 30 as a high pressure stream. The gas entrained water is then forced under pressure back into the gas entrainment tank 24. The gas entrained water in the gas entrainment tank 24 is continuously returned to the flotation container 12 through a return piping configuration 34.

Pressure in the gas entrainment tank 24 is maintained between 80 and 100 psi by means of a compression source 33 connected to the gas entrainment tank through a compressed gas inlet pipe 35 and further connected to a digester 37, to the flotation container 12, and to an alternate gas source (not shown) through gas lines 39, 41, and 43, respectively. Gas generated through the anaerobic digestive process in the digester 37 and to a lesser degree in the flotation container 12 is recycled therefrom into the compression source 33 where it is pressurized for injection into the gas entrainment system 25.

The gas entrained water flows from the gas entrainment tank 24 through the return piping 34 as a result of the maintained tank pressure. Return piping 34 intersects with a digester pipe 36, mixing the gas entrained water from the return piping with wastewater channeled from the digester 37 into the digester pipe and channeling the resulting mixture through inlet 38 into the lowermost part of the flotation container 12.

The gas entrainment cycle is a continuous one whereby approximately one-third ($\frac{1}{3}$) to one-half ($\frac{1}{2}$) of the total flow through the flotation system 10 is passed through the gas entrainment tank 24, thereby increasing the level of gas entrainment of the system to improve flotation of particles from the water, and resulting in higher levels of clarity of the treated wastewater.

Referring now to FIGS. 2, 3, 4 and 5 there is shown the flotation container 12 of FIG. 1. Wastewater from the digester 37 is introduced into the flotation container 12 from inlet 38 through inlet pipe 40. Wastewater then enters a chamber 42 from where it flows into the flotation container 12. The flotation container 12 is supported on legs 50 equally spaced along the length thereof. Particles in the wastewater are floated to the surface of the water by gas bubbles contained within the water in the container 12. As the particles are floated to the surface of the liquid held in the container 12, a foam or sludge layer forms on the top of the liquid. Contained within the sludge layer are digestive bacteria necessary for the anaerobic digestive process.

Figure 2:
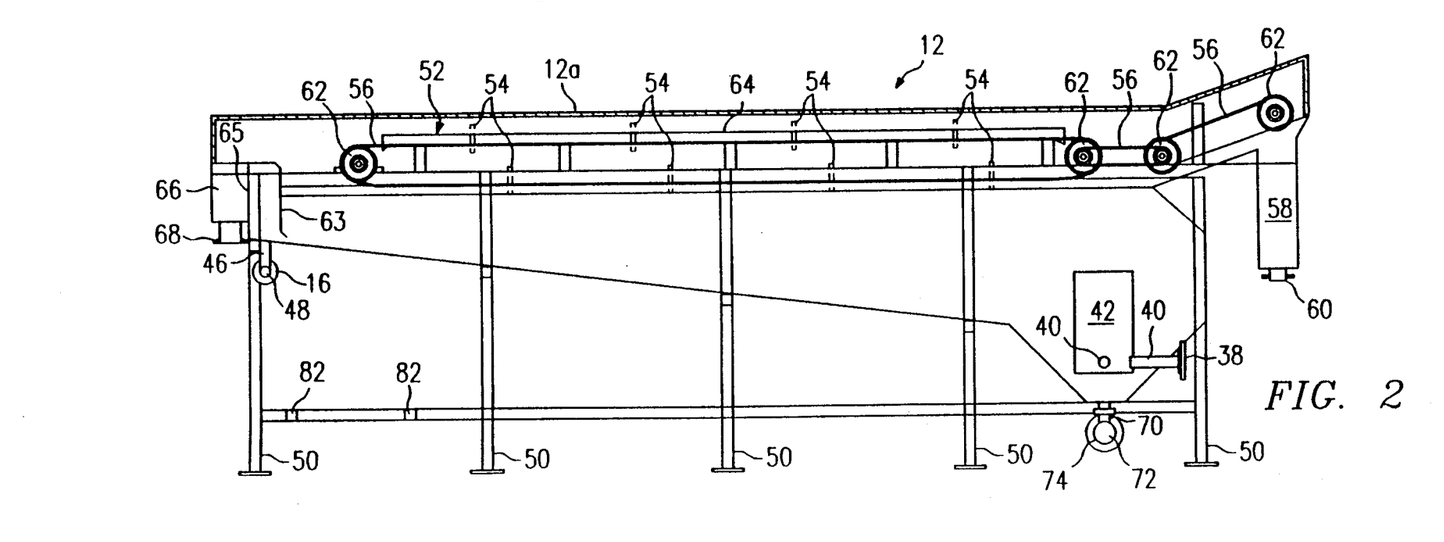
FIG. 2 is a partial section side view of the flotation container of FIG. 1.
Figure 3:
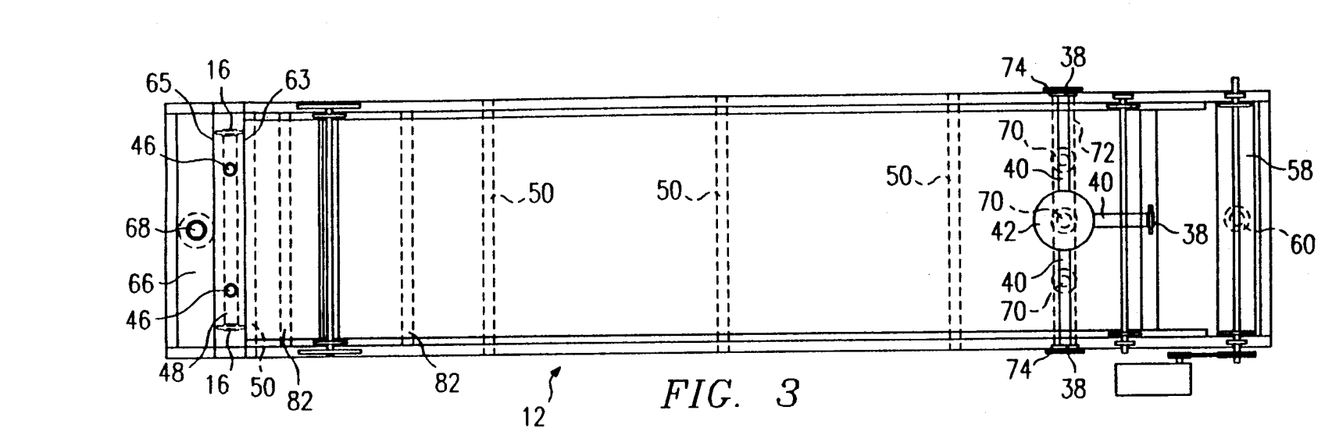
FIG. 3 is a top view of the flotation container of FIG. 2 with the lid removed.

A rake 52 having paddles 54 mounted on chains 56 skims the sludge layer from the liquid into a discharge chute 58 and through a drain 60, to be recycled into the digester 37 for continued anaerobic digestion or otherwise further processed. The chains 56 are moved by means of rotating sprockets 62. The rake 52 passes over a frame 64 mounted above and to the walls of the container 12 as the chains 56 rotate with the sprockets 62. As shown in FIG. 1 the lid 12a covers the rake 52 to enclose the interior of the flotation container 12 to prevent the introduction of air or oxygen into the system.

Figure 4:
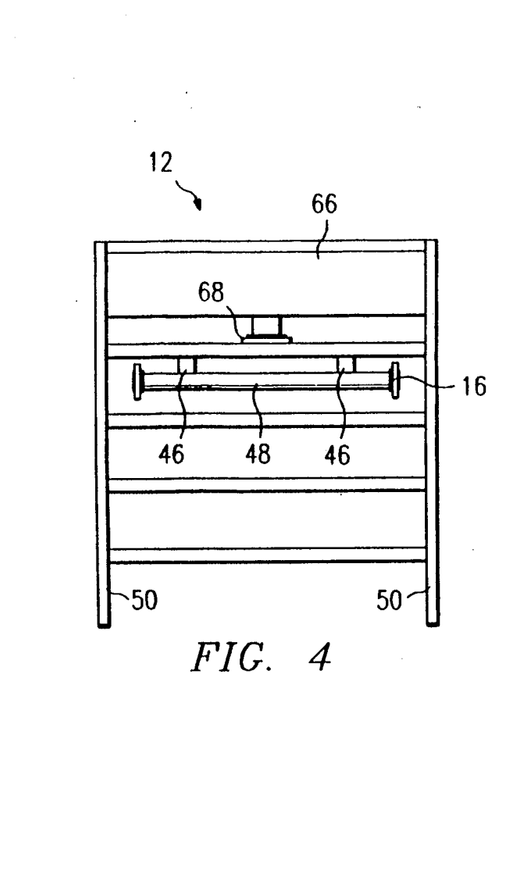
FIG. 4 is a front view of the flotation container of FIG. 2, illustrating in greater detail the outlets through which the wastewater is cycled to the aeration system.
Figure 5:
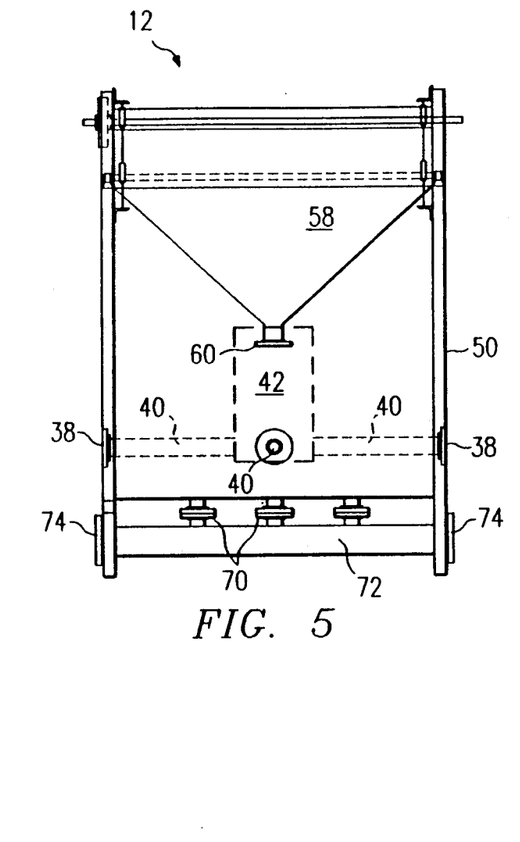
FIG. 5 is a back view of the flotation container of FIG. 2, illustrating in greater detail the inlets for returning aerated water from the aeration system to the flotation container.

Wastewater having the desired degree of clarification is discharged from the container 12 into an effluent discharge chute 66 and out a drain 68 after passing under a baffle 63 and over a dam 65 as shown in FIGS. 2, 3, and 4. The heavier particles that may settle to the bottom of the container 12 are discharged from the system through drains 70 into a drain pipe 72, and out through outlets 74 as shown in FIGS. 2, 3, and 5.

Referring now to FIGS. 2, 3, 4, 6, and 7, to increase the number of gas bubbles in the water and thereby improve flotation of the particles to the surface, the water is withdrawn from the container 12 through drains 46 into an outlet pipe 48 from where it is pumped through the particular outlet 16 having the recycle pipe 18 connected thereto. The flow of the water from the container 12 is directed through the recycle pipe 18 into the gas entrainment system 25.

Figure 6:
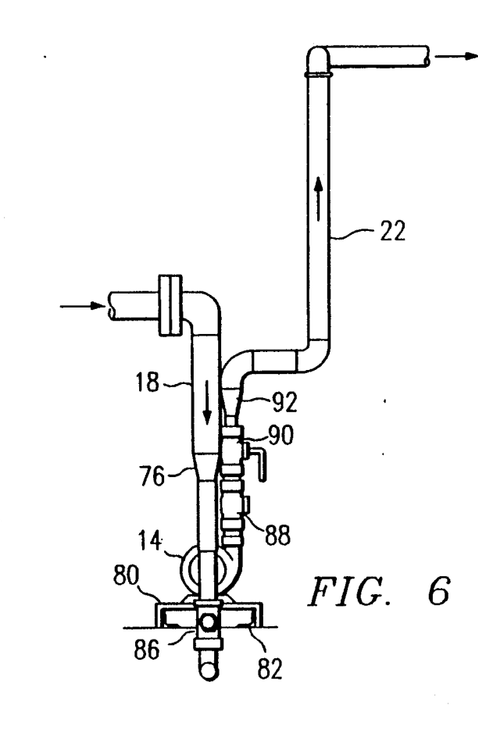
FIG. 6 is a side view of the recycle pump and pipe configuration for directing wastewater from the flotation container to the aeration system of FIG. 1.
Figure 7:
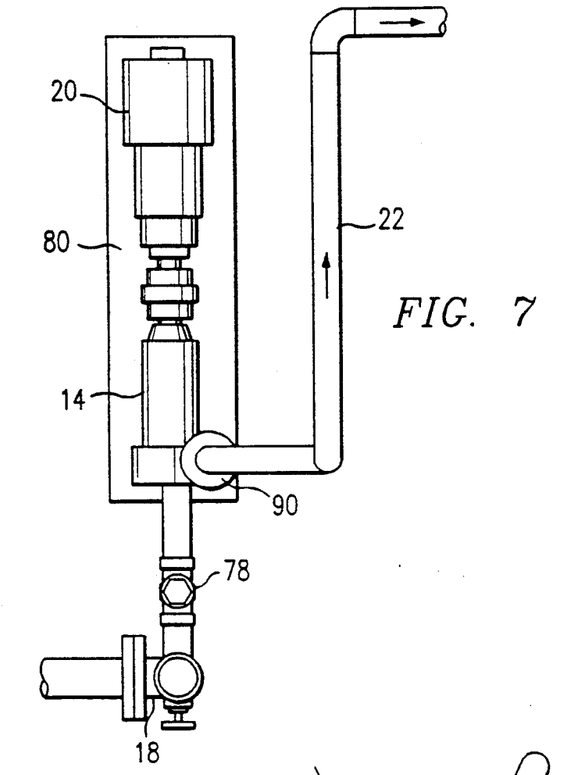
FIG. 7 is a top view of the recycle pump and pipe configuration of FIG. 6.

Referring now to FIGS. 6 and 7, the wastewater circulated from the flotation container 12 through the gas entrainment system 25 is pumped from the flotation container and into the recycle pipe 18 by the recycle pump 14. The pump 14 is driven by a motor 20 and pumps wastewater from the flotation container 12 through the recycle pipe 18, through a concentric reducer 76 into the gas entrainment tank 24. As shown in FIG. 7, a full port ball valve 78 regulates the flow of water from the recycle pipe 18 and into the pump 14. The recycle pump 14 and motor 20 are mounted on a base 80 mounted on pump mount runners 82 as shown in FIGS. 2 and 3.

As shown in FIG. 6, a full port ball valve 86 directs wastewater from the recycle pipe 18 in the event of maintenance and repairs. The flow of wastewater from the recycle pump 14 passes through and is controlled by a check valve 88 and a full port ball valve 90. The wastewater then passes through a concentric reducer 92 into the connecting pipe 22 for delivery to the gas entrainment tank 24.

Figure 8:
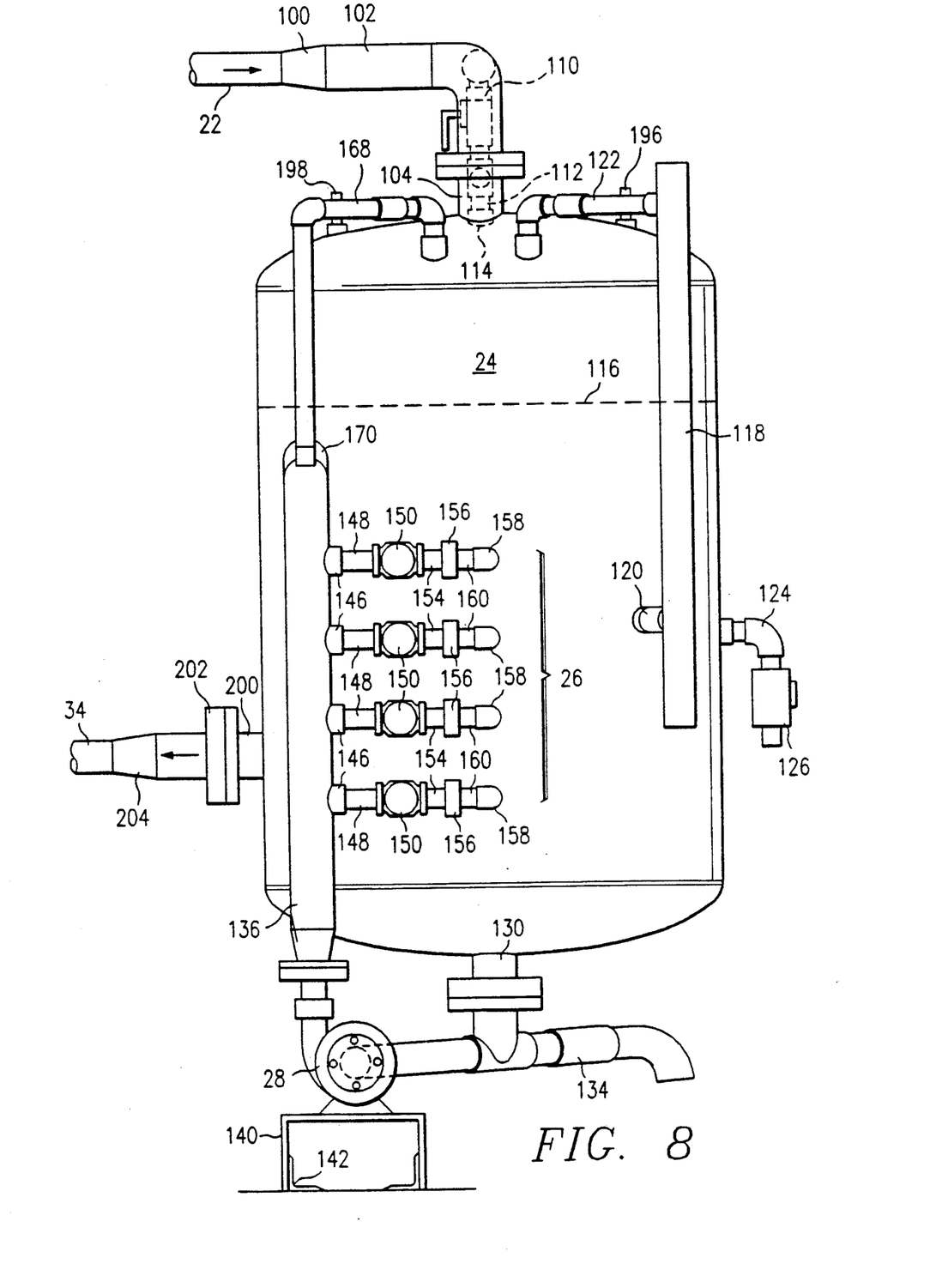
FIG. 8 is a side view of the aeration system of FIG. 1.

Referring now to FIG. 8, as the wastewater is delivered through the connecting pipe 22 to the gas entrainment tank 24 it passes through a concentric expander 100 into a delivery pipe 102. The wastewater in the delivery pipe 102 then passes through an inlet 104 in the top center of the gas entrainment tank 24.

Figure 9:
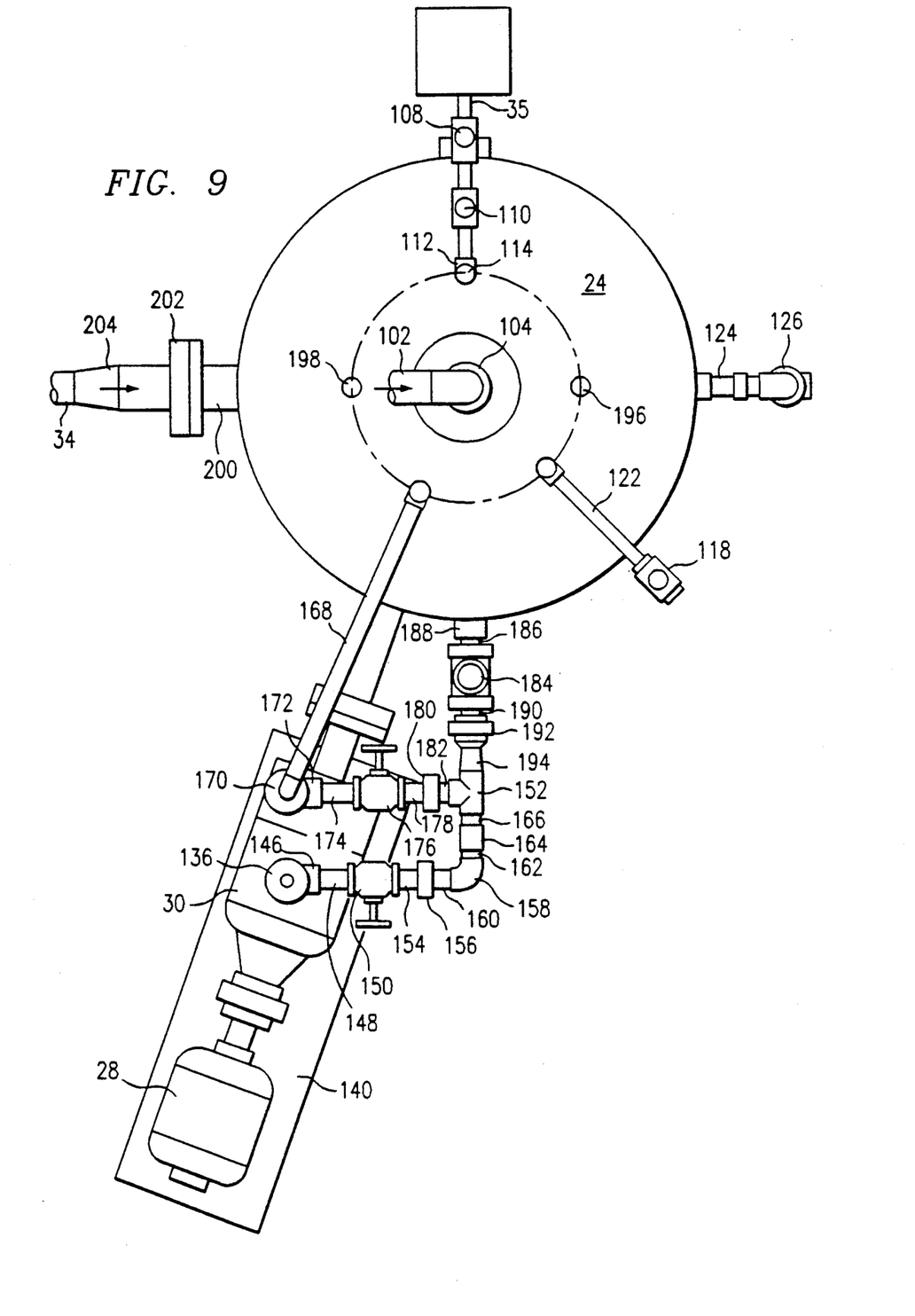
FIG. 9 is a top view of the aeration system of FIG. 8.

As shown in FIGS. 8 and 9, compressed gas recycled from the digester 37 and the flotation container 12, and gas from the alternate gas source (not shown) if needed, is input into the gas entrainment tank 24 through a pipe 35 and a check valve 110, with the flow of compressed gas being controlled by a solenoid valve 108. The compressed gas supply piping also includes a reducer tee 112 connected to an inlet pipe 114 mounted in the top of the gas entrainment tank 24. The pressure in the gas entrainment tank 24 is maintained at 80-100 psi with the result that the wastewater is maintained at a level of approximately 36", indicated by line 116, to provide continuous flow of gas entrained water from the system while achieving maximum entrainment of gas in the water.

A visual level indicator 118 continuously indicates and controls the level of the wastewater in the gas entrainment tank 24. The level indicator 118 is connected to the interior of the aeration tank 24 at one point by a connecting pipe 120 positioned in the wall of the tank 24 at a point well below the water level 116. A pipe 122 connects the level indicator 118 to the gas entrainment tank 24 at a second point well above the water level 116.

Compressed gas in the upper portion of the gas entrainment tank 24 enters the level indicator 118 through the pipe 122. Wastewater from the gas entrainment tank 24 is forced under the action of the maintained pressure into the lower portion to the level indicator 118 through the connecting pipe 120.

Located in the level indicator 118 are two magnetic switches (not shown) connected through a conventional electrical system (not shown) to the solenoid valve 108. As the water in the level indicator 118 contacts the uppermost switch, the solenoid valve 108 is opened to allow the flow of compressed gas into the gas entrainment tank 24, thereby lowering the water level. As the water level drops below the lowermost magnetic switch, the solenoid valve 108 is closed to halt the flow of compressed gas into the gas entrainment tank 24, allowing the water level in the tank to rise. Thus, the water level in the gas entrainment tank 24 is continuously measured and controlled by the level indicator 118. A drain pipe 124 and a ball valve 126 are connected to the wall of the gas entrainment tank 24 to allow for draining of wastewater from the tank.

Referring now to FIGS. 8 and 9, the water in the gas entrainment tank 24 is charged with gas by pumping the water from the gas entrainment tank through an outlet pipe 130 by means of the pump 30. Operative power for the pump 30 is provided by the motor 28. The motor 28 and pump 30 are mounted on a channel base 140 having angle clip feet 142.

Figure 10:
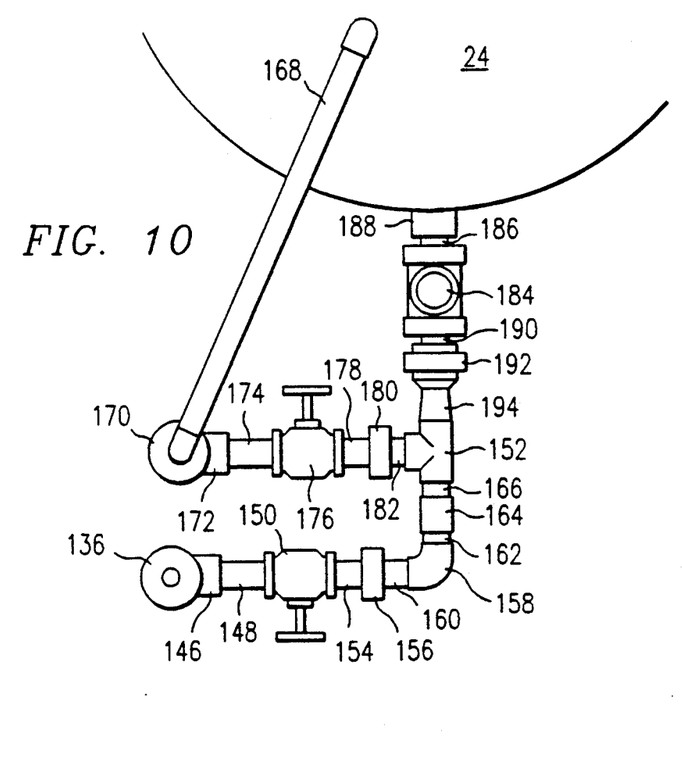
FIG. 10 is a partial top view similar to FIG. 9 showing only the gas and water jet configuration of the aeration system of FIG. 8.

Referring now to FIGS. 8, 9, and 10, a full port ball valve 134 connected in the outlet pipe 130 provides a means for draining the wastewater from the pump 30 and gas entrainment tank 24. The wastewater from the gas entrainment tank 24 is pumped by means of the pump 30 into a manifold 136 mounted above the pump and parallel to the gas entrainment tank. The wastewater in the manifold 136 is pumped under pressure through a multiple unit jet configuration 26 wherein each unit comprises a coupling 146 attached to the manifold 136 at one end and a nipple 148 on the other end. Mounted to the nipple 148 is a ball valve 150 which regulates the flow of wastewater from the manifold 136 into a jet 152. The ball valve 150 is connected by a nipple 154 to a female union 156, in turn connected to an elbow 158 by a nipple 160. The elbow 158 is connected by a nipple 162 to a thread reducer coupling 164, in turn connected to the jet 152 by a nipple 166. The water is forced under pressure through the piping configuration and into the jet 152 as a high pressure stream.

Still referring to FIGS. 8, 9, and 10, compressed gas contained in the upper portion of the gas entrainment tank 24 is also introduced into the jets 152. The compressed gas from the gas entrainment tank 24 passes through a pipe 168 mounted in the top of the gas entrainment tank 24 and extending downwardly for attachment to the top of a gas manifold 170. The gas is directed from the gas manifold 170 into the jets 152 through pipe configuration similar to the pipe configuration directing the flow of wastewater from the manifold 136 to the jets 152. Thus, as shown in FIGS. 9 and 10, for each piping configuration, there is attached to the gas manifold a coupling 172 connected by a nipple 174 to a full port ball valve 176, to regulate the flow of the compressed gas into the jet 152. The ball valve 176 is connected by a nipple 178 to a female union 180, in turn connected by a nipple 182 to the jet 152.

As the compressed gas enters the jets 152, it is entrained into the high pressure stream of water being forced through the jets 152, thereby mixing the compressed gas and wastewater under pressure and forcing the resulting gas entrained water back into the gas entrainment tank 24 through a full port ball valve 184. The valve 184 regulates the flow of the high pressure stream of gas entrained water from the jets 152 into the gas entrainment tank 24 and is connected to the tank through a nipple 186 connected to a coupling 188 mounted to the wall of the tank at a point well below the water level 116. By means of a nipple 190, the ball valve 184 is connected to a male/female union 192, in turn connected to the discharge section 194 of the jet 152. The action of pumping the wastewater through the multiple jet configuration 26 efficiently utilizes the compressed gas generated by anaerobic digestion in the treatment system to entrain the gas in the wastewater.

Still referring to FIGS. 8 and 9, there is located in the top of the gas entrainment tank 24 a sample outlet 196 for checking the contents of the tank and a safety/relief valve 198 to allow for the release of excess pressure in the tank. As the wastewater is continually recycled through the multiple jet configuration 26, gas entrained wastewater is also being returned from the gas entrainment tank 24 to the flotation container 12. The gas entrained water exits the gas entrainment tank 24 through a pipe 200 having a flange 202 and a concentric reducer 204 for directing the gas entrained water through the pipe 34 into the flotation container 12.

Referring now to FIGS. 11 and 12, the flow of gas entrained wastewater in the pipe 34 to the flotation container 12 is regulated by a globe valve 220. As the gas entrained water passes through the globe valve 220, it makes a 45° turn through an elbow 222 and enters the digester pipe 36. The digester pipe 36 is connected at the uppermost end through a concentric reducer 226 to a pipe 228 from the digester 37. Thus, the digester pipe 36 receives gas entrained water from the gas entrainment tank 24 as well as wastewater from the digester 37. As shown in FIGS. 1 and 11, the digester pipe 36 is connected to the flotation container 12 by an elbow 230 attached to an inlet 38.

Again referring to FIGS. 1, 2, 3 and 5, as the gas entrained wastewater passes through the inlet 38, it enters the inlet pipe 40 and moves into the chamber 42 from where it ultimately flows into the flotation container 12. After the gas entrained wastewater enters the flotation container 12, particles entrained by the bubbles are floated to the surface of the wastewater being held in the flotation container 12 to further clarify the wastewater.

By entraining gas in the wastewater through use of the above-described process, the gas generated through the anaerobic digestive process is more efficiently utilized to obtain greater flotation of particles from the wastewater with a resultant increase in clarification. Additionally, the method of entraining gas in the wastewater outside of the flotation container 12 results in less movement in the flotation container contents, thereby reducing the disturbance of the sludge layer, and allowing for more efficient flotation of particles to the surface of the wastewater contained within the flotation container.

Although the preferred embodiment of the present invention has been illustrated in the accompanying Drawings and described in the foregoing Detailed Description, it will be appreciated by those skilled in the art that various modifications and rearrangements of the component steps of the process of the present invention are possible within the scope of the present invention.

I claim:

1. A process for treatment of wastewater comprising the steps of:
   (a) applying a stream of wastewater from an anaerobic digester to an enclosed flotation container;
   (b) withdrawing a stream of wastewater from the enclosed flotation container;
   (c) applying the stream of wastewater withdrawn from the enclosed flotation container into a gas entrainment tank;
   (d) collecting an essentially oxygen free gas produced by anaerobic digestion from the anaerobic digester and from the enclosed flotation container;
   (e) compressing the essentially oxygen free gas collected from the anaerobic digester and from the enclosed flotation container;

(f) introducing the essentially oxygen free compressed gas into the gas entrainment tank to pressurize the gas entrainment tank;

(g) introducing a stream of wastewater withdrawn from a lower portion of the gas entrainment tank into a plurality of jets for injection into the gas entrainment tank;

(h) introducing essentially oxygen free gas collected from the top of the gas entrainment tank into each of the plurality of jets for entrainment of the essentially oxygen free gas in the wastewater;

(i) withdrawing a stream of gas entrained wastewater from the gas entrainment tank;

(j) adding the stream of gas entrained wastewater to the stream of wastewater from the anaerobic digester prior to applying the stream to the flotation container, whereby the entrained essentially oxygen free gas bubbles particles from the wastewater upon introduction into the flotation container to form a sludge;

(k) withdrawing a sludge formed in the flotation container; and (l) introducing the sludge into the anaerobic digester.

2. The process of claim 1 wherein the stream of wastewater withdrawn from the enclosed flotation container and introduced to the gas entrainment tank comprises approximately 33% to 50% of the total flow of wastewater through the flotation container.

3. The process of claim 1 wherein the pressure in the gas entrainment tank is maintained at from about 80 p.s.i. to about 100 p.s.i.

4. The process of claim 1 wherein the flow of the essentially oxygen free compressed gas into the gas entrainment tank is controlled to maintain the level of wastewater in the gas entrainment tank at a predetermined level.

5. The process of claim 4 wherein the level of wastewater in the gas entrainment tank is maintained at a predetermined level above the plurality of jets.

6. A process for treatment of wastewater comprising the steps of:

(a) applying a stream of wastewater from an anaerobic digester to an enclosed flotation container;

(b) withdrawing a stream of wastewater from the enclosed flotation container, the stream comprising approximately 33% to 50% of the total flow of wastewater through the flotation container;

(c) applying the stream of wastewater withdrawn from the enclosed flotation container into a gas entrainment tank;

(d) collecting an essentially oxygen free gas produced by anaerobic digestion from the anaerobic digester and from the enclosed flotation container;

(e) compressing the essentially oxygen free gas collected from the anaerobic digester and from the enclosed flotation container;

(f) introducing the essentially oxygen free compressed gas into the gas entrainment tank to pressurize the gas entrainment tank to a pressure of from about 80 p.s.i. to about 100 p.s.i.;

(g) introducing a stream of wastewater withdrawn from a lower portion of the gas entrainment tank into a plurality of jets for injection into the gas entrainment tank;

(h) introducing essentially oxygen free gas collected from the top of the gas entrainment tank into each of the plurality of jets for entrainment of the essentially oxygen free gas in the wastewater;

(i) withdrawing a stream of gas entrained wastewater from the gas entrainment tank;

(j) adding the stream of gas entrained wastewater to the stream of wastewater from the anaerobic digester prior to applying the stream to the flotation container, whereby the entrained essentially oxygen free gas bubbles particles from the wastewater upon introduction into the flotation container to form a sludge;

(k) withdrawing a sludge formed in the flotation container; and (l) introducing the sludge into the anaerobic digester.

7. The process of claim 6 wherein the flow of the essentially oxygen free compressed gas into the gas entrainment tank is controlled to maintain the level of wastewater in the gas entrainment tank at a predetermined level.

8. The process of claim 7 wherein the level of wastewater in the gas entrainment tank is maintained at a predetermined level above the plurality of jets.

* * * * *